US012717379B2

(12) United States Patent
Hao

(10) Patent No.: US 12,717,379 B2
(45) Date of Patent: Aug. 25, 2026

(54) EXPANDED SCREEN

(71) Applicant: OBDSPACE TECHNOLOGY CO., LTD, Shenzhen (CN)

(72) Inventor: Xiaofeng Hao, Shenzhen (CN)

(73) Assignee: OBDSPACE TECHNOLOGY CO., LTD., Shenzhen (CN)

( * ) Notice: Subject to any disclaimer, the term of this patent is extended or adjusted under 35 U.S.C. 154(b) by 407 days.

(21) Appl. No.: 18/483,267

(22) Filed: Oct. 9, 2023

(65) Prior Publication Data

US 2025/0093909 A1 Mar. 20, 2025

(30) Foreign Application Priority Data

Sep. 14, 2023 (CN) ........................ 202322504109.6

(51) Int. Cl.
*G06F 1/16* (2006.01)

(52) U.S. Cl.
CPC .......... *G06F 1/1622* (2013.01); *G06F 1/1607* (2013.01); *G06F 1/1624* (2013.01)

(58) Field of Classification Search
CPC ...... G06F 1/1681; G06F 1/162; G06F 1/1679; G06F 1/1622; G06F 1/1654; G06F 1/1656; G06F 1/1632; G06F 1/1626; G06F 1/1616; G06F 1/1669; E05D 3/10; F16M 11/10; F16M 11/2014; F16M 11/12
See application file for complete search history.

(56) References Cited

U.S. PATENT DOCUMENTS 6,804,861 B2 * 10/2004 Hsu ........................ G06F 1/1681 16/374
6,867,961 B2 * 3/2005 Choi ........................ G06F 1/162 361/679.06
7,096,540 B2 * 8/2006 Watanabe ........... H04M 1/0212 16/337
7,251,129 B2 * 7/2007 Lee ........................ G06F 1/1681 361/679.55
7,419,099 B2 * 9/2008 Lee ..................... H04M 1/0212 455/575.4
7,663,874 B2 * 2/2010 Hattori .................... G06F 1/162 340/870.11
7,752,711 B1 * 7/2010 Chen ........................ G06F 1/162 16/347
8,006,347 B2 * 8/2011 Sue ........................ G06F 1/1616 16/338
8,861,187 B2 * 10/2014 Takahashi ............... G06F 1/162 361/679.06

(Continued)

*Primary Examiner* — Gage Crum

(57) ABSTRACT

The present disclosure provides an expanded screen. The expanded screen includes a display device, a fixed device, a first rotating assembly and a second rotating assembly. The fixed device is configured to be fixed on a display. The first rotating assembly is rotatably connected to the display device. One end of the second rotating assembly is rotatably connected to the first rotating assembly, and the other end of the second rotating assembly is connected to the fixed device. The fixed device rotates through the first rotating assembly around a first axial direction. The fixed device rotates through the second rotating assembly around a second axial direction. The first axial direction is a width extending direction of the display device and the second axial direction is a direction perpendicular to a display surface of the display.

15 Claims, 12 Drawing Sheets

(56) References Cited

U.S. PATENT DOCUMENTS

| | | | | |
|---|---|---|---|---|
| 2004/0012920 | A1* | 1/2004 | Tanimoto | G06F 1/1681 248/917 |
| 2004/0190239 | A1* | 9/2004 | Weng | G06F 1/1669 361/679.2 |
| 2004/0219957 | A1* | 11/2004 | Nishijima | H04M 1/0243 455/575.1 |
| 2005/0155183 | A1* | 7/2005 | Lu | A47K 3/38 16/340 |
| 2005/0207104 | A1* | 9/2005 | Love | G06F 1/162 16/221 |
| 2005/0221874 | A1* | 10/2005 | Cho | H04M 1/0227 455/575.4 |
| 2006/0034450 | A1* | 2/2006 | Chang | H04M 1/0212 379/433.12 |
| 2008/0078060 | A1* | 4/2008 | Chen | G06F 1/1681 16/367 |
| 2008/0120805 | A1* | 5/2008 | Su | G06F 1/1681 16/239 |
| 2009/0002927 | A1* | 1/2009 | Iijima | G06F 1/1643 |
| 2010/0180403 | A1* | 7/2010 | Wei | G06F 1/162 16/371 |
| 2012/0146915 | A1* | 6/2012 | Chen | G06F 1/1635 345/169 |
| 2014/0047672 | A1* | 2/2014 | Saito | H04M 1/0216 16/341 |
| 2022/0035420 | A1* | 2/2022 | Wang | G06F 3/0412 |
| 2024/0055200 | A1* | 2/2024 | Liu | G06F 3/0202 |

* cited by examiner

EXPANDED SCREEN

CROSS-REFERENCE TO RELATED APPLICATIONS

The application claims priority of Chinese patent application CN202322504109.6, filed on Sep. 14, 2023, which is incorporated herein by reference in its entireties.

TECHNICAL FIELD

The present disclosure relates to an expanded screen, applied to the technical field of terminal devices.

BACKGROUND

In the prior art, terminals have been essential in people's lives. With the growth of people's needs, terminals with expanded screens have also come into being. In a production process of conventional terminal products such as a notebook and a desktop display, a size of a screen has been determined, but in practical applications, it is difficult to meet needs of customers for multiple screens or large screens. Therefore, in order to meet the needs of the consumers, a split-screen displaying technology is usually used to achieve a multi-screen displaying effect.

At present, firstly, a fixed device of the existing expanded screen is usually connected to a display device of the expanded screen. However, this hinge method can only achieve rotation in one direction, and a user cannot adjust the display device in multiple dimensions, so that the flexibility of use is low, and the user experience is poor. Secondly, an expanded screen of a portable multi-screen device sold in the market is unremovable, so that the expanded screen needs to be carried if it is not necessary to use the expanded screen, and the expanded screen is inconvenient to carry.

SUMMARY

A fixed device of the above-mentioned expanded screen in the prior art is usually connected to a display device of the expanded screen in a hinged manner, but this hinge method only achieves rotation in one direction, so that the flexibility of use is low, and it is not convenient for a user to adjust an angle of a display screen, making poor user experience. The present disclosure provides an expanded screen. A display device of the expanded screen is connected to a fixed device of the expanded screen, and the fixed device can rotate in different directions through a first rotating assembly and a second rotating assembly, so that the fixed device of the expanded screen can be adjusted in multiple directions, and the display device can achieve multidimensional displaying, which improves the flexibility of use of the expanded screen and improves the user experience.

The technical solution adopted by the present disclosure to solve the technical problem is as follows: An expanded screen, wherein the expanded screen includes: a display device; a fixed device, wherein the fixed device is configured to be fixed on a display; a first rotating assembly, wherein the first rotating assembly is rotatably connected to the display device; and a second rotating assembly, wherein one end of the second rotating assembly is rotatably connected to the first rotating assembly, and the other end of the second rotating assembly is connected to the fixed device; the fixed device rotates through the first rotating assembly around a first axial direction; the fixed device rotates through the second rotating assembly around a second axial direction; the first axial direction is a width extending direction of the display device; and the second axial direction is a direction perpendicular to a display surface of the display.

Further, the fixed device is configured to be fixed on the display in a magnetic suction manner.

Further, the fixed device includes magnetic suction members and a fixed device main body; the magnetic suction members are arranged in the fixed device main body; the magnetic suction members are configured to be sucked to the display; the fixed device main body is connected to the second rotating assembly; and when the second rotating assembly rotates, the second rotating assembly drives the fixed device main body to rotate.

Further, the fixed device main body includes a base and a cover plate; the base is connected to the second rotating assembly; when the second rotating assembly rotates, the second rotating assembly drives the base to rotate; the base is provided with one or more mounting slots; the magnetic suction members are mounted in the mounting slots; and the cover plate is mounted on the base and covers the magnetic suction members.

Further, the expanded screen further includes a supporting member; and the supporting member is rotatably arranged on the fixed device.

Further, the first rotating assembly includes a first connector and a second connector; the first connector is fixedly connected to the display device; the second connector is rotatably connected to the first connector; the second connector rotates around the first axial direction; and the second rotating assembly is rotatably connected with the second connector.

Further, the second connector is a U-shaped connecting plate; the U-shaped connecting plate includes a first connecting plate, a second connecting plate, and a third connecting plate; the first connecting plate and the second connecting plate are arranged on both sides of the third connecting plate; the first connecting plate and the second connecting plate are rotatably connected to the first connector; first clamping members are arranged on an inner side of the first connecting plate and an inner side of the second connecting plate; the first clamping members sleeve the first connector; two or more first clamping slots are arranged on an inner side wall of the first connecting plate and an inner side wall of the second connecting plate; the first clamping members are provided with first clamping protrusions corresponding to the first clamping slots; the first clamping protrusions are arranged in the first clamping slots; the first clamping protrusions slide from one first clamping slot to the other adjacent first clamping slot; or, two or more first clamping protrusions are arranged on an inner side wall of the first connecting plate and an inner side wall of the second connecting plate; the first clamping members are provided with first clamping slots corresponding to the first clamping protrusions; the first clamping protrusions are arranged in the first clamping slots; and the first clamping protrusions slide from one first clamping slot to the other adjacent first clamping slot.

Further, the first rotating assembly further includes an outer shell; and the first connector and the second connector are arranged in the outer shell.

Further, a gap is arranged on one side surface of the display device; there are two first connectors; the two first connectors are respectively arranged on two sides of the gap and are fixedly connected to the display device; the first connecting plate and the second connecting plate are respectively connected to the two first connectors; a space is reserved between the two first connectors; a box body is fixedly arranged on an inner side of the outer shell; the box body is located in the space; the box body is fixedly connected to U-shaped connecting plate; one end, located on an inner side of the U-shaped connecting plate, of the second rotating assembly is arranged in the box body; and the second rotating assembly rotates relative to the box body.

Further, the first connector includes a fixed end and a connecting end; a stop portion is arranged between the fixed end and the connecting end; the fixed end is fixedly connected to the display device; the first connecting plate and the second connecting plate are rotatably connected to the connecting end; and the first connecting plate and the second connecting plate are fixed between the stop portion and the first nut through a first nut.

Further, the connecting end is a connecting column; at least one first section is arranged on an outer side wall of the connecting column; a through hole is formed in each first clamping member; the through hole is matched with a shape of an outer side wall of the connecting column; the through hole sleeves the outer side wall of the connecting column, so that the connecting column drives the first clamping member to rotate.

Further, one or more first elastic members are arranged between the first clamping member and the first nut.

Further, a connecting portion extending outwards is arranged on one side surface of the display device; the gap is arranged on the connecting portion; and the fixed end is fixedly connected to the connecting portion.

Further, the second rotating assembly includes a rotating shaft and second clamping members; one end of the rotating shaft is connected to the fixed device, and the other end of the rotating shaft is rotatably connected through the third connecting plate; the rotating shaft is perpendicular to the third connecting plate; the second clamping members sleeve the rotating shaft, and the second clamping members are arranged on an outer side surface and an inner side surface of the third connecting plate; the second clamping members are provided with two or more second clamping protrusions towards the third connecting plate; the third connecting plate is provided with second clamping slots corresponding to the second clamping protrusions; the second clamping protrusions are arranged in the second clamping slots; the second clamping protrusions slide from one second clamping slot to the other adjacent second clamping slot; or, the second clamping members are provided with two or more second clamping slots towards the third connecting plate; the third connecting plate is provided with second clamping protrusions corresponding to the second clamping slots; the second clamping protrusions are arranged in the second clamping slots; and the second clamping protrusions slide from one second clamping slot to the other adjacent second clamping slot.

Further, the second rotating assembly further includes a third connector; the third connector sleeves the rotating shaft; the third connector is fixedly connected to the fixed device; and when the rotating shaft rotates, the third connector is driven to rotate, so that the third connector drives the fixed device to rotate.

Further, the second rotating assembly further includes a separator; and the separator is arranged between the third connector and the second clamping member close to the third connector, so that the third connector is separated from the second clamping member close to the third connector.

Further, the second rotating assembly further includes second nuts; the second nuts are arranged at two ends of the rotating shaft; the third connector, the separator, the second clamping member, and the third connecting plate are arranged between the two second nuts; the second rotating assembly further includes one or more second elastic members; and each second elastic member is located between the second nut arranged on an inner side of the third connecting plate and the second clamping member.

Further, at least one second section is arranged on an outer side wall of the rotating shaft.

Further, An expanded screen includes a display device and a fixed device. The fixed device is configured to be fixed on a display; and a rotating assembly, wherein the fixed device is rotatably connected to the display device through the rotating assembly; and when the expanded screen is fixed on the display, the display device rotates around a direction perpendicular to a display surface of the display, so that the display device is switched between a usage state of being located at a side edge of the display and a stored state of being superposed on the display.

Further, in a rotating process of the display device, a display surface of the display device is kept being parallel to the display surface of the display.

Beneficial effects of the present disclosure are as follows: The present disclosure provides an expanded screen. Firstly, a display device and a fixed device can rotate in different directions through a first rotating assembly and a second rotating assembly. Due to the rotation in two directions, the fixed device of the expanded screen can be adjusted in multiple directions, so that the display device can achieve multidimensional displaying, which improves the flexibility of use of the expanded screen and improves the user experience. Secondly, the fixed device can be quickly fixed to a display through a magnetic suction structure which is easy to assemble and has low cost. Thirdly, by the independent use of one rotating assembly, the fixed device can rotate to a position above the display device, which reduces the volume and makes it easier for a user to store and carry the expanded screen. During use, the fixed device can expand towards a width extending direction of the display device.

DETAILED DESCRIPTION OF THE EMBODIMENTS

In order to make the aims, technical solution and advantages of the present disclosure will be clearly, the present disclosure is further described below in combination with accompanying drawings and implementations. It should be understood that the specific embodiments described herein are intended only to explain the present disclosure and are not intended to define the present disclosure.

Referring to FIG. 1 to FIG. 14, the present disclosure provides an expanded screen. The expanded screen can achieve information transmission to a display in a plugged, wired, and/or wireless manner. A constitution of the expanded screen can be a structure of a well-known display screen, which will not be limited here. The expanded screen can be detachably mounted on the display. The expanded screen includes a display device 1, a fixed device 2, a first rotating assembly 3, and a second rotating assembly 4.

Figure 1:
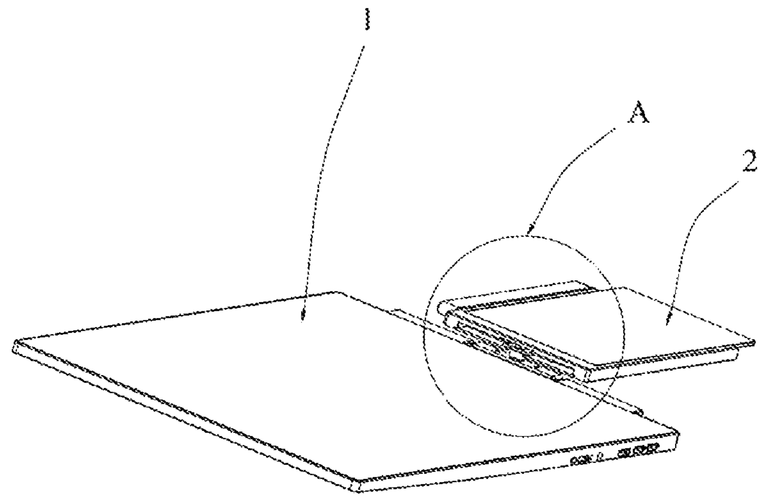
FIG. 1 is a three-dimensional diagram of an expanded screen according to the present disclosure.
Figure 2:
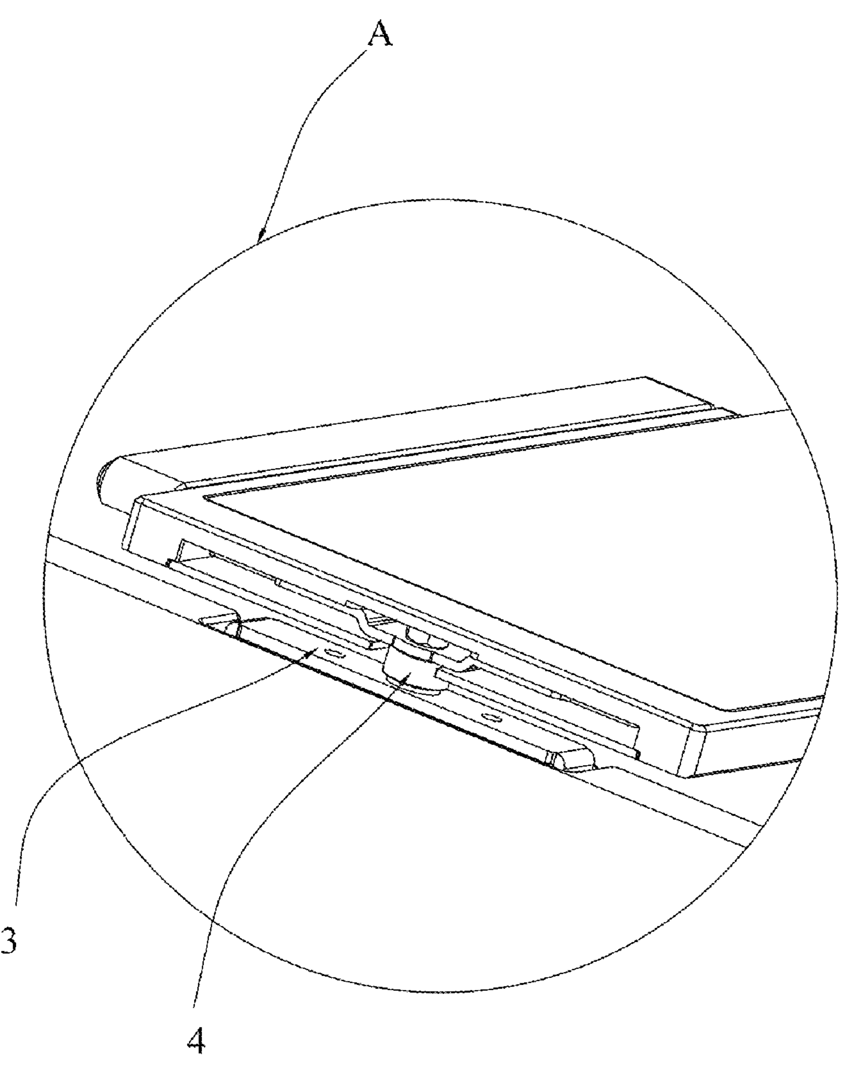
FIG. 2 is an enlarged diagram of A according to the present disclosure.
Figure 11:
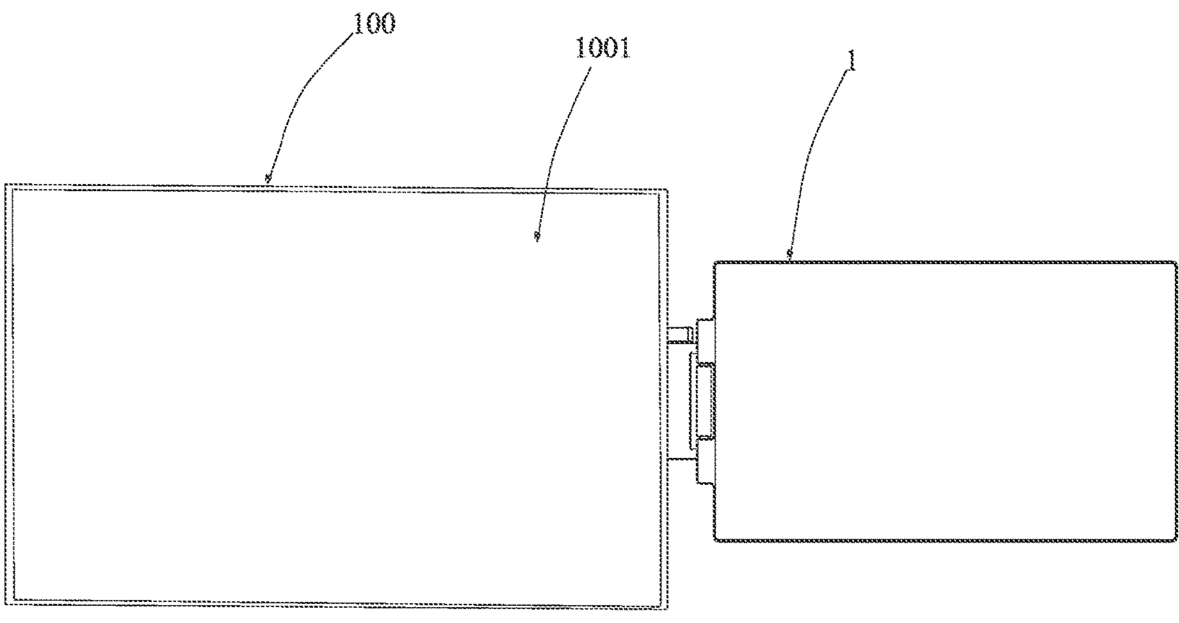
FIG. 11 is a diagram of a usage state of an expanded screen according to the present disclosure.
Figure 12:
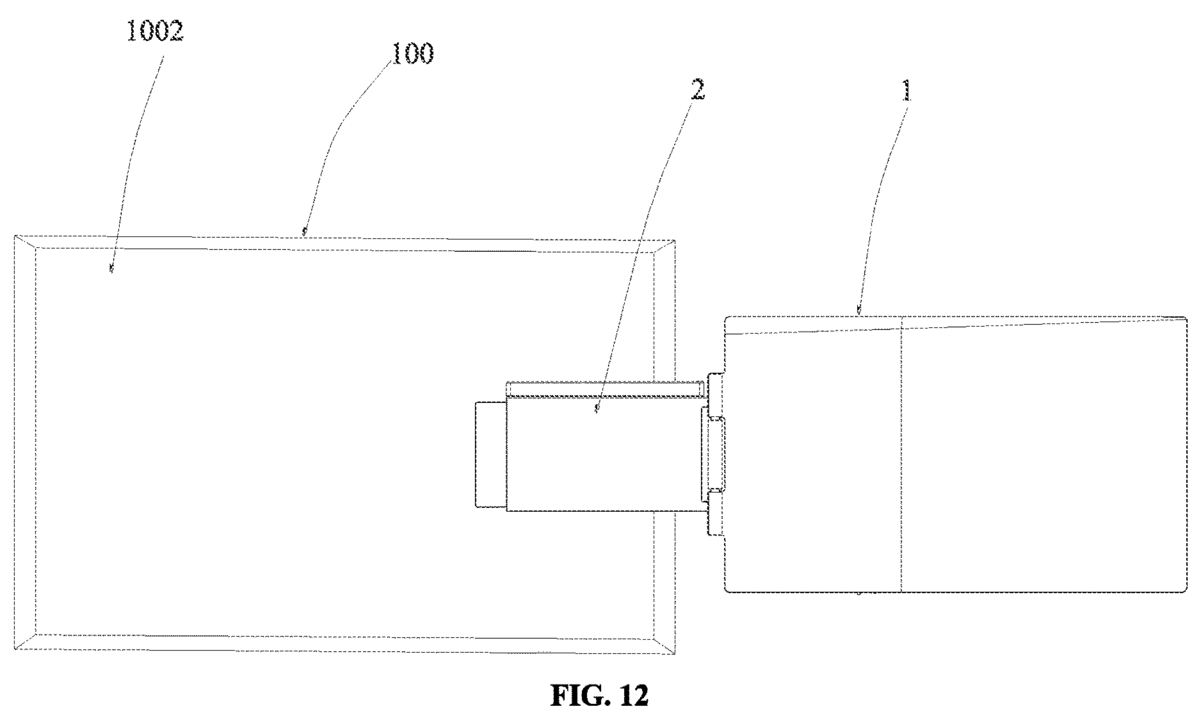
FIG. 12 is a diagram of a usage state of an expanded screen according to the present disclosure.
Figure 13:
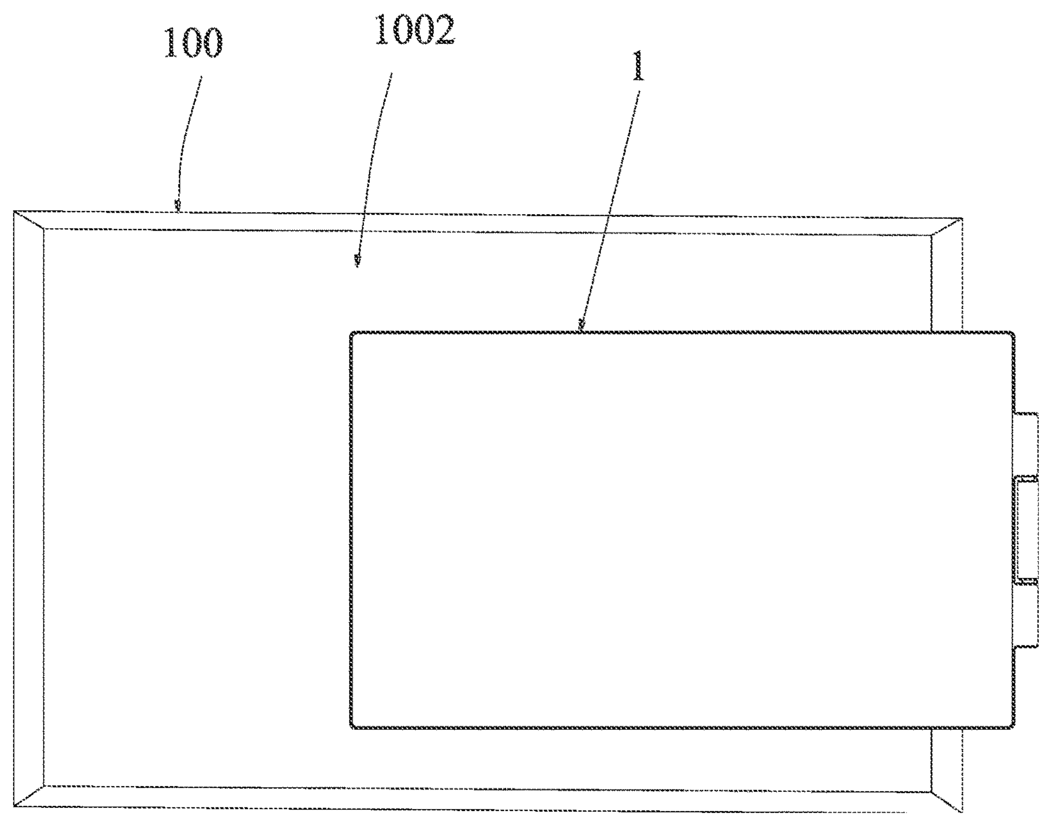
FIG. 13 is a diagram of a usage state of an expanded screen according to the present disclosure.
Figure 14:
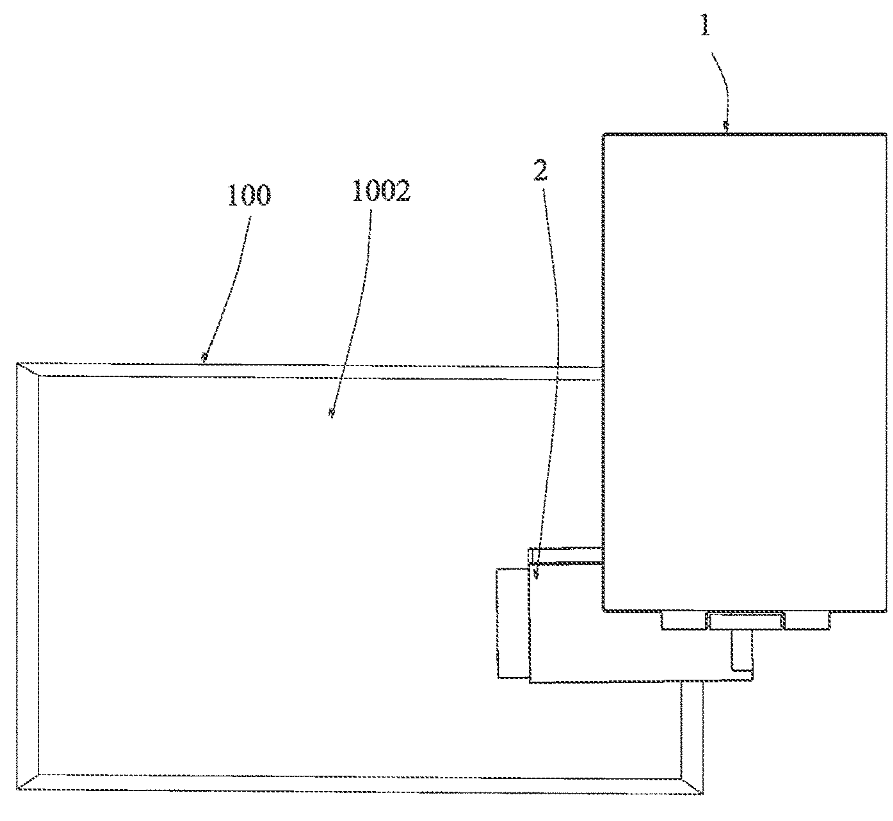
FIG. 14 is a diagram of a usage state of an expanded screen according to the present disclosure.

After the above display device 1 is configured to be in signal connection to a terminal device, the display device 1 displays a picture that a user wants to present. The display device 1 can be fixed on the display through the fixed device 2 to achieve multi-screen watching for a user. The fixed device 2 can be rotatably connected to the display device 1 around a first axial direction through the first rotating assembly 3. One end of the second rotating assembly 4 is rotatably connected to the first rotating assembly 3, and the other end of the second rotating assembly 4 is connected to the fixed device 2. The fixed device 2 rotates around the first axial direction through the first rotating assembly 3, and the fixed device 2 rotates around a second axial direction through the second rotating assembly 4. The first axial direction is a width extending direction or length extending direction of the display device 1, and the second axial direction is a direction perpendicular to a display surface 1001 of the display. As shown in FIG. 11 to FIG. 14, the display surface of the display is denoted by 1001, where 1001 represents the display surface of the display. In fact, it can also be a back surface 1002 of the display. Preferably, the first axial direction is perpendicular to and second axial direction, but not limited to the first axial direction being perpendicular to and second axial direction. The second axial direction can be arbitrarily set. As shown in FIG. 1, it can be understood that the first axial direction is a Z-axis direction, and the second axial direction is a Y-axis direction. As shown in FIG. 11 to FIG. 13, the first rotating assembly rotates around a Z-axis, and the display device can extend to a side surface of the display, which can rotate from a front surface of the display device to a back surface of the display device, or rotate back from the back surface of the display device to the front surface of the display device. The display device can be in any angle, and can also be folded to facilitate carrying. As shown in FIG. 14, the second axial direction is the Y-axis direction. The second rotating assembly can rotate clockwise or anticlockwise 360 degrees around the second axial direction, which increases a fixed angle of the fixed device and makes the display device achieve multi-angle displaying. By means of the first rotating assembly and the second rotating assembly, the fixed device can rotate in different directions, so that the display device can achieve the multidimensional displaying, which improves the flexibility of use of the expanded screen and improves the user experience.

It can be understood that when the fixed device 2 rotates through the second rotating assembly 4 around the second axial direction, the display surface of the display device arranged on the fixed device 2 can be switched between a usage state of being located at a side edge of the display and a stored state of being superposed on the display. Furthermore, when the display device 1 rotates around the second axial direction, the display surface of the display device 1 can be kept being parallel to the display surface 1001 of the display.

In this embodiment, the fixed device 2 is fixed to the display in a magnetic suction manner. Compared with the clamping method or fixing by bolts and nuts in the prior art, the magnetic suction is simple and convenient for mounting, so that the fixed device can be quickly fixed on the display, and time and labor of mounting the expanded screen are saved for a user.

Figure 5:
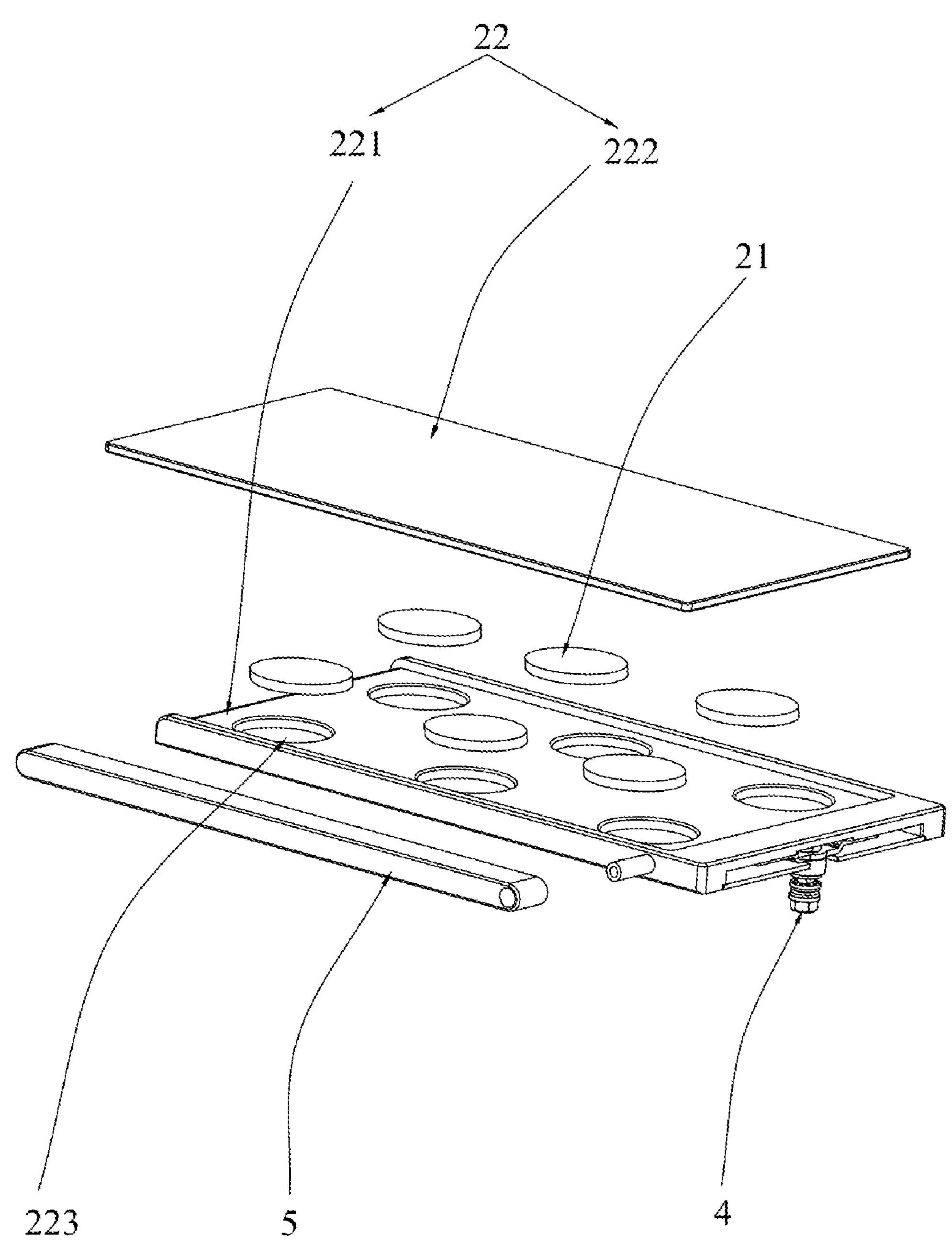
FIG. 5 is a schematic structural diagram of a fixed device according to the present disclosure.

In this embodiment, as shown in FIG. 5, the fixed device 2 includes magnetic suction members 21 and a fixed device main body 22. The magnetic suction members 21 are arranged in the fixed device main body 22. The magnetic suction members 21 can be configured to be attracted on the display. The fixed device main body 22 is connected to the second rotating assembly 4. When the second rotating assembly 4 rotates, the second rotating assembly 4 drives the fixed device main body 22 to rotate. The fixed device main body mainly achieves an effect of carrying the magnetic suction members. The magnetic suction members can be magnets which have low costs to reduce the manufacturing cost of the expanded screen. If the clamping method is used for fixing, there are many parts used, so that the research cost is high, causing high manufacturing cost of the expanded screen.

In this embodiment, as shown in FIG. 5, the fixed device main body 22 includes a base 221 and a cover plate 222. The base 221 is connected to the second rotating assembly 4. When the second rotating assembly 4 rotates, the second rotating assembly 4 drives the base 221 to rotate. The base 221 is provided with one or more mounting slots 223. The magnetic suction members 21 are mounted in the mounting slots 223. The cover plate 222 is mounted on the base 221 and covers the magnetic suction members 21. The base 221, the cover plate 222, and the magnetic suction members 21 are simple in structure and are all common materials in the prior art, so that the cost is low. No complex parts are used, so that the assembling is also easy. An inner side surface of the above base 221 can also be provided with a sliding chute, and the cover plate 222 can be detachably plugged into the sliding chute to be more convenient for assembling.

In this embodiment, as shown in FIG. 5, the expanded screen further includes a supporting member 5. The supporting member 5 is rotatably arranged on the fixed device 2. When the expanded screen is placed on a platform, the supporting member 5 and the fixed device 2 cooperate to make the display device stand. Compared with the existing expanded screen which is not provided with a separate supporting frame, if a user does not want to clamp the expanded screen on a display for use, the user can only find another support, or hold the expanded screen, leading to inconvenience of use.

Figure 6:
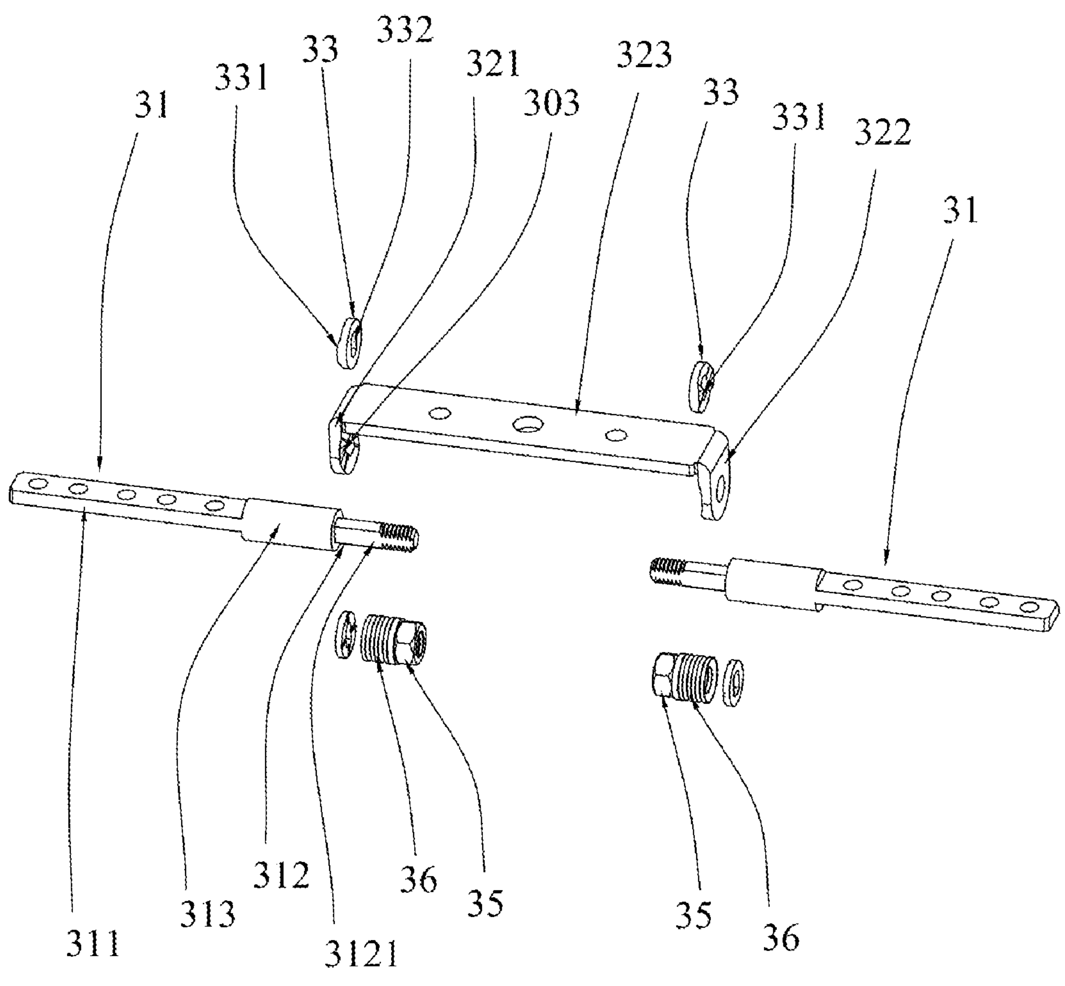
FIG. 6 is an exploded diagram of a first connecting assembly according to the present disclosure.
Figure 7:
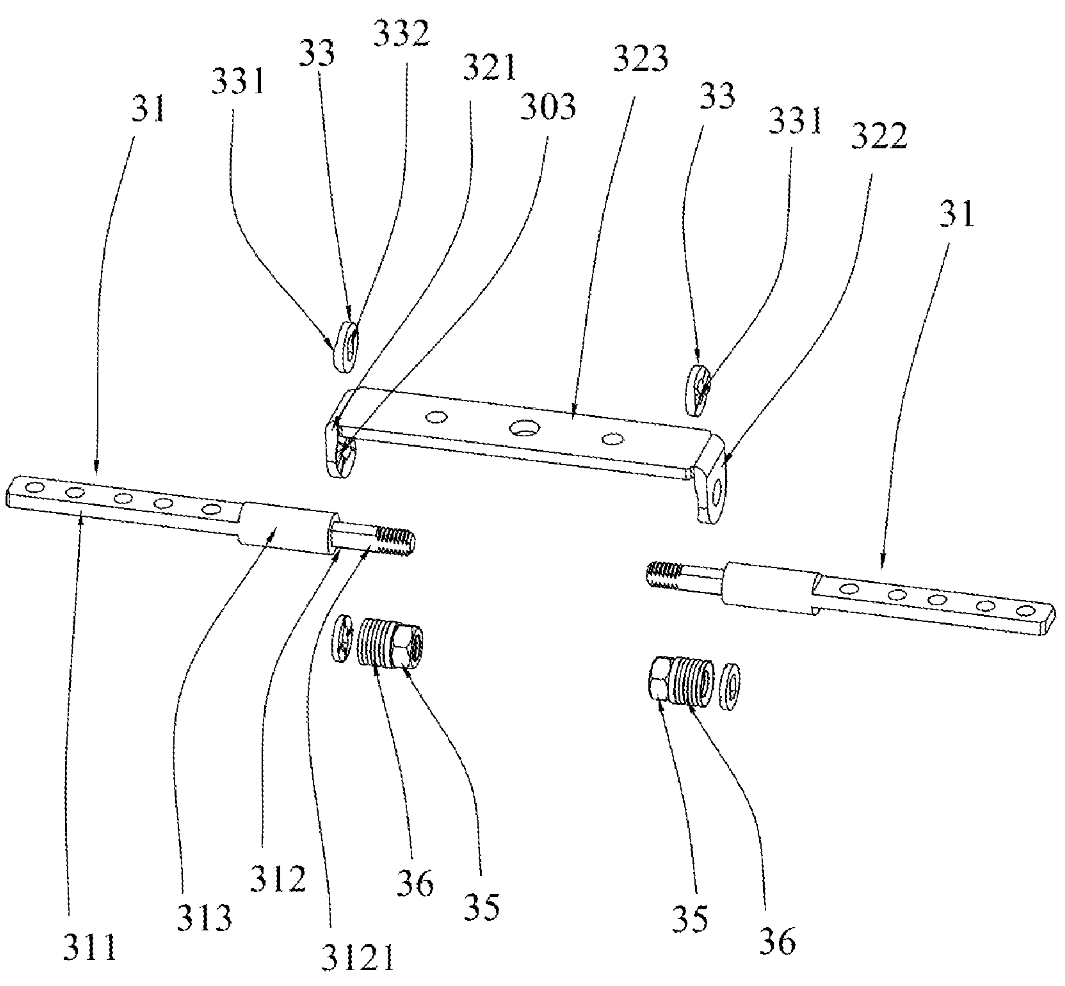
FIG. 7 is a schematic diagram of connection between a first connecting assembly and a second connecting assembly according to the present disclosure.

In this embodiment, as shown in FIG. 6, the first rotating assembly 3 includes first connectors 31 and a second connector 32. The first connectors 31 are fixedly connected to the display device 1. The second connector 32 is rotatably connected to the first connectors 31. The second connector 32 rotates around the first axial direction. The second rotating assembly 4 is rotatably connected with the second connector 32. The first connectors 31 achieve a connecting and fixing effect, and the second connector mainly drives the fixed device to rotate around the first axial direction, so that a user can adjust an angle of the fixed device.

In this embodiment, as shown in FIG. 6, the second connector 32 is a U-shaped connecting plate; the U-shaped connecting plate includes a first connecting plate 321, a second connecting plate 322, and a third connecting plate 323; the first connecting plate 321 and the second connecting plate 322 are arranged on both sides of the third connecting plate 323; the first connecting plate 321 and the second connecting plate 322 are rotatably connected to the first connectors 31; first clamping members 33 are arranged on an inner side of the first connecting plate 321 and an inner side of the second connecting plate 322; the first clamping members 33 sleeve the first connectors 31; two or more first clamping slots 303 are arranged on an inner side wall of the first connecting plate 321 and an inner side wall of the second connecting plate 322; the first clamping members 33 are provided with first clamping protrusions 331 corresponding to the first clamping slots 303; the first clamping protrusions 331 are arranged in the first clamping slots 303; the first clamping protrusions 331 can slide from one first clamping slot 303 to the other adjacent first clamping slot 303; or, two or more first clamping protrusions 331 are arranged on an inner side wall of the first connecting plate 321 and an inner side wall of the second connecting plate 322; the first clamping members 33 are provided with first clamping slots 303 corresponding to the first clamping protrusions 331; the first clamping protrusions 331 are arranged in the first clamping slots 303; and the first clamping protrusions 331 can slide from one first clamping slot 303 to the other adjacent first clamping slot 303. It is more convenient for mounting using the U-shaped connecting plate. The first clamping members 33 are mainly configured to lock an angle after rotation and provide a sense of shifting for a user. Arranging more first clamping slots 303 and more first clamping protrusions 331 can achieve more angles of rotation, so that the fixed device can be adjusted in multiple angles, and the practicability of the expanded screen is improved.

In this embodiment, as shown in FIG. 6, the first rotating assembly 3 further includes an outer shell 34. The first connectors 31 and the second connector 32 are arranged in the outer shell 34, so that parts at junctions of the entire expanded screen will not be exposed, and the appearance is tidier.

Figure 4:
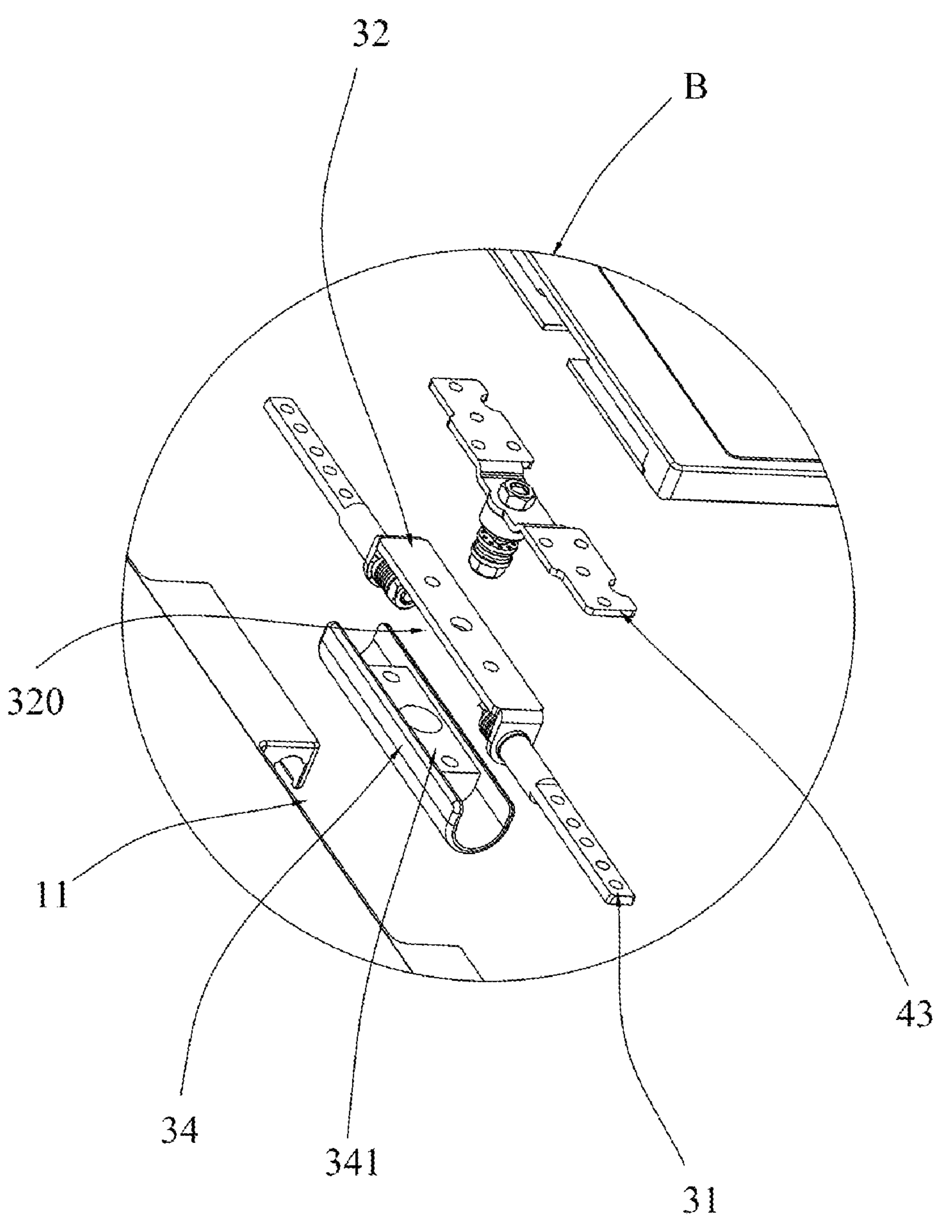
FIG. 4 is an enlarged diagram of B according to the present disclosure.

In this embodiment, as shown in FIG. 4, a gap 11 is arranged on one side surface of the display device 1; there are two first connectors 31; the two first connectors 31 are respectively arranged on two sides of the gap 11 and are fixedly connected to the display device 1; the first connecting plate 321 and the second connecting plate 322 are respectively connected to the two first connectors 31; a space 320 is reserved between the two first connectors 31; a box body 341 is fixedly arranged on an inner side of the outer shell 34; the box body 341 is located in the space 320; the box body 341 is fixedly connected to U-shaped connecting plate; one end, located on an inner side of the U-shaped connecting plate, of the second rotating assembly 4 is arranged in the box body 341; and the second rotating assembly 4 rotates relative to the box body 341. There are two first connectors, and the space is reserved between the two first connectors, so that the end, located on the inner side, of the second rotating assembly is arranged in the box body, which reduces an area used by the parts and makes the appearance of the expanded screen tidier. The outer shell can be arc-shaped.

In this embodiment, as shown in FIG. 6, each first connector 31 includes a fixed end 311 and a connecting end 312; a stop portion 313 is arranged between the fixed end 311 and the connecting end 312; the fixed end 311 is fixedly connected to the display device 1; the first connecting plate 321 and the second connecting plate 322 are rotatably connected to the connecting end 312; and the first connecting plate 321 and the second connecting plate 322 are fixed between the stop portion 313 and the first nut 35 through a first nut 35. The fixed end 311 and the connecting end 312 are set precisely, so that the assembling time can be saved. It should be noted that a movement space needs to be reserved between the first clamping members and the first connecting plate 321 as well as the second connecting plate 322, and the first clamping protrusions 331 on the first clamping members need to slide from one first clamping slot to the other first clamping slot, so that the stop portion 313 and the first nut 35 need to provide the movement space between the first clamping members and the first connecting plate 321 as well as the second connecting plate 322. However, one or more first elastic members 36 can also be arranged between each first clamping member 33 and each first nut 35. The elastic members have rebound resilience, so that the movement space is reserved between the first clamping member and the first connecting plate 321 as well as the second connecting plate 322. The first elastic members may be clastic gaskets, springs, or silica gel. In this embodiment, the elastic gaskets are preferred. Higher rebound resilience can be achieved by arranging a plurality of clastic gaskets, which is more convenient for the rotation of the first clamping members.

In this embodiment, as shown in FIG. 6, each connecting end 312 is a connecting column; at least one first section 3121 is arranged on an outer side wall of the connecting column; a through hole 332 is formed in each first clamping member 33; the through hole 332 is matched with a shape of an outer side wall of the connecting column; the through hole 332 sleeves the outer side wall of the connecting column, so that the connecting column can drive the first clamping member 33 to rotate. The first section 3121 is arranged on the outer side wall of the connecting column, so that the through hole of the first clamping member is matched with the shape of the outer side wall of the connecting column. This setting is convenient and simple, and demolding is facilitated. Compared with the use of bolts and nuts or the design of clamping holes and clamping columns, this fixing method is simple and is also convenient for assembling.

Figure 3:
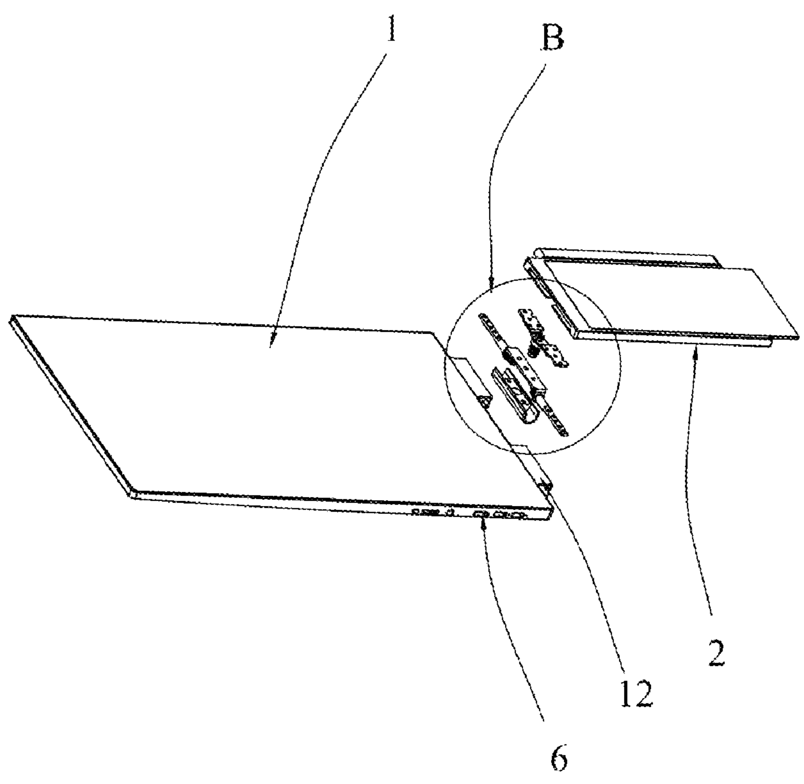
FIG. 3 is a schematic structural diagram of an expanded screen according to the present disclosure.

In this embodiment, as shown in FIG. 3 to FIG. 4, a connecting portion 12 extending outwards is arranged on one side surface of the display device 1; the gap 11 is arranged on the connecting portion 12; and the fixed end 311 is fixedly connected to the connecting portion 12. By the arrangement of the connecting portion 12, the first rotating assembly is easier to assemble.

Figure 8:
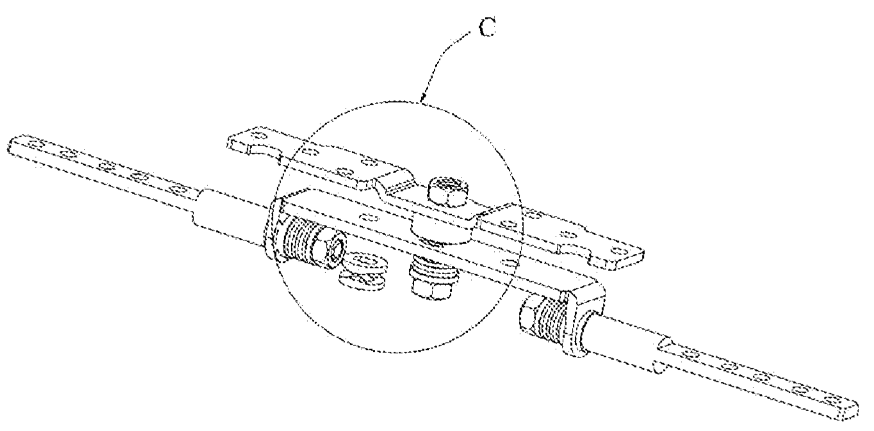
FIG. 8 is an enlarged diagram of C according to the present disclosure.
Figure 9:
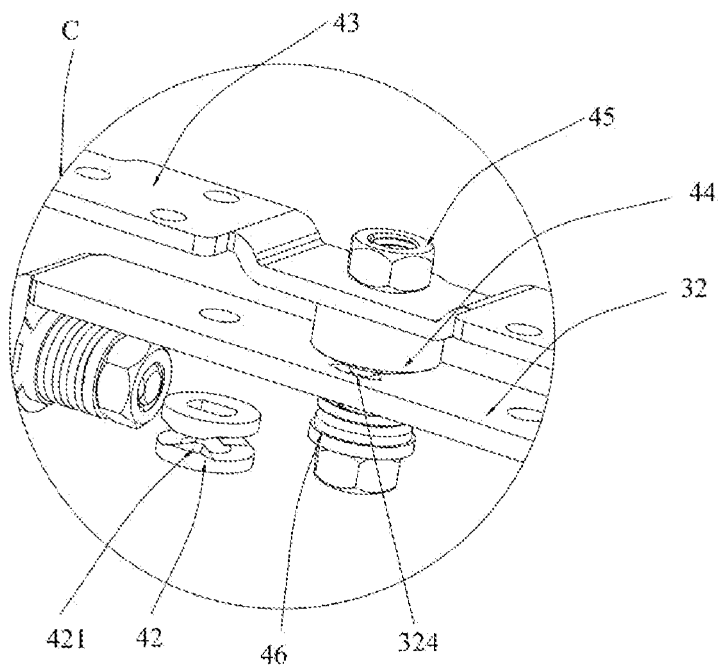
FIG. 9 is a schematic structural diagram of a second connecting assembly according to the present disclosure.
Figure 10:
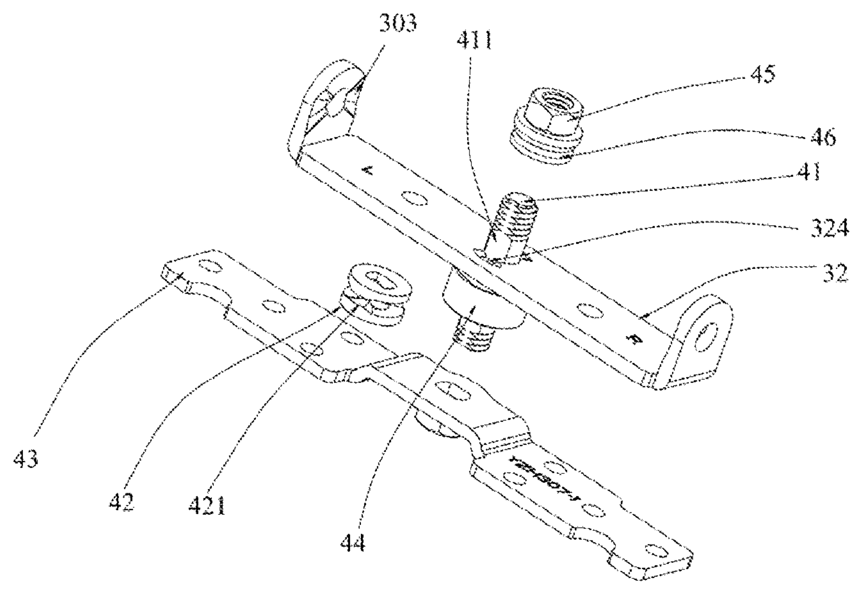
FIG. 10 is an exploded diagram of a first connecting assembly according to the present disclosure.

In this embodiment, as shown in FIGS. 8 to 10, the second rotating assembly 4 includes a rotating shaft 41 and second clamping members 42. One end of the rotating shaft 41 is connected to the fixed device 2, and the other end of the rotating shaft 41 is rotatably connected through the third connecting plate 323; the rotating shaft 41 is perpendicular to the third connecting plate; 323 the second clamping members 42 sleeve the rotating shaft 41, and the second clamping members 42 are arranged on an outer side surface and an inner side surface of the third connecting plate 323; the second clamping members 42 are provided with two or more second clamping protrusions 421 towards the third connecting plate 323; the third connecting plate 323 is provided with second clamping slots 324 corresponding to the second clamping protrusions 421; the second clamping protrusions 421 are arranged in the second clamping slots 324; the second clamping protrusions 421 can slide from one second clamping slot 324 to the other adjacent second clamping slot 324; or, the second clamping members 42 are provided with two or more second clamping slots 324 towards the third connecting plate 323; the third connecting plate 323 is provided with second clamping protrusions 421 corresponding to the second clamping slots 324; the second clamping protrusions 421 are arranged in the second clamping slots 324; and the second clamping protrusions 421 can slide from one second clamping slot 324 to the other adjacent second clamping slot 324. The rotating shaft 41 drives the fixed device to rotate 360 degrees around the Y-axis direction. The second clamping members are mainly configured to lock an angle after rotation and provide a sense of shifting for a user. Arranging more second clamping slots 324 and more second clamping protrusions 421 can achieve more angles of clamping, so that the practicability of the expanded screen is improved.

In this embodiment, as shown in FIG. 8 to FIG. 10, the second rotating assembly 4 further includes a third connector 43; the third connector 43 sleeves the rotating shaft 41; the third connector 43 is fixedly connected to the fixed device 2; and when the rotating shaft 41 rotates, the third connector 43 is driven to rotate, so that the third connector 43 drives the fixed device 2 to rotate. The rotating shaft cannot be directly and fixedly connected to the fixed device, but by the arrangement of the third connector, it is convenient for fixed connection to the fixed device.

In this embodiment, as shown in FIG. 8 to FIG. 10, the second rotating assembly 4 further includes a separator 44; and the separator 44 is arranged between the third connector 43 and the second clamping member 42 close to the third connector 43, so that the third connector 43 is separated from the second clamping member 42 close to the third connector 43. There is a certain distance between the display device and the fixed device. When the fixed device rotates in the first axial direction, the fixed device can abut against the back surface of the display device or the front surface of the display device, so that an angle of rotation of the fixed device is larger, and it is also convenient to adjust the fixed device to rotate around the second axial direction. The separator is preferably integrally molded with the rotating shaft.

In this embodiment, the second rotating assembly 4 further includes second nuts 45; the second nuts 45 are arranged at two ends of the rotating shaft 41; the third connector 43, the separator 44, the second clamping member 42, and the third connecting plate 323 are arranged between the two second nuts 45. It should be noted that a movement space needs to be reserved between the second clamping member and the third connecting plate. The second clamping protrusion on the second clamping member needs to slide from one first second clamping slot to the other second clamping slot, so that the movement space between the second clamping member and the third connecting plate needs to be reserved during the setting of the two second nuts. However, a second clastic member 46 can also be arranged between the second nut 45 arranged on an inner side of the third connecting plate 323 and the second clamping member 42. The clastic member has rebound resilience, so that the movement space can be reserved between the second nut 45 arranged on the inner side of the third connecting plate 323 and the second clamping member 42.

In this embodiment, as shown in FIG. 8 to FIG. 10, the second rotating assembly 4 further includes one or more second clastic members 46. The second elastic members 46 are located between the second nut 45 arranged on an inner side of the third connecting plate 323 and the second clamping member 42. The clastic member has rebound resilience, so that the movement space can be reserved between the second clamping member and the third connecting plate 323. The second elastic members may be elastic gaskets, springs, or silica gel. In this embodiment, the elastic gaskets are preferred. Higher rebound resilience can be achieved by arranging a plurality of clastic gaskets, which is more convenient for the rotation of the second clamping members.

In this embodiment, as shown in FIG. 8 to FIG. 10, at least one second section 411 is arranged on an outer side wall of the rotating shaft 41. The through hole of the second clamping member is matched with a shape of the rotating shaft 41. This setting is convenient and simple, and demolding is facilitated. Compared with the use of bolts and nuts or the design of clamping holes and clamping columns, this fixing method is simple and is also convenient for assembling.

In this embodiment, as shown in FIG. 3, the expanded screen further includes a connection interface 6. The connection interface 6 is arranged on the display device 1, which is convenient for the connection to the terminal device, but the terminal device can also transmit signals for connection through Bluetooth or wireless fidelity.

Figure 15:
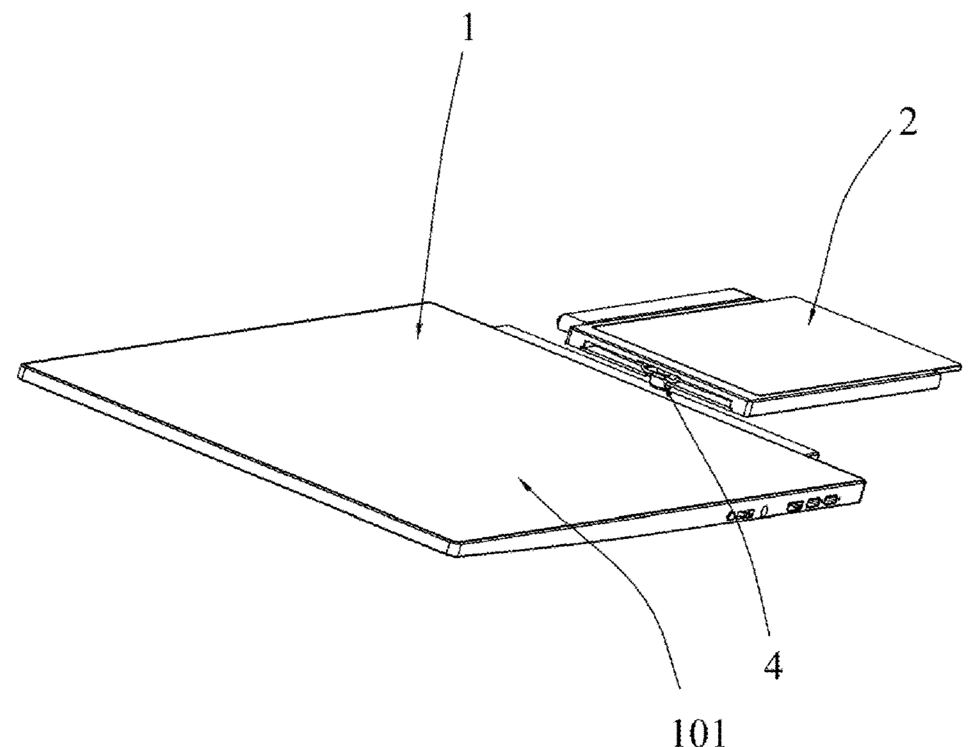
FIG. 15 is a schematic diagram of a modifiable embodiment according to the present disclosure.
Figure 16:
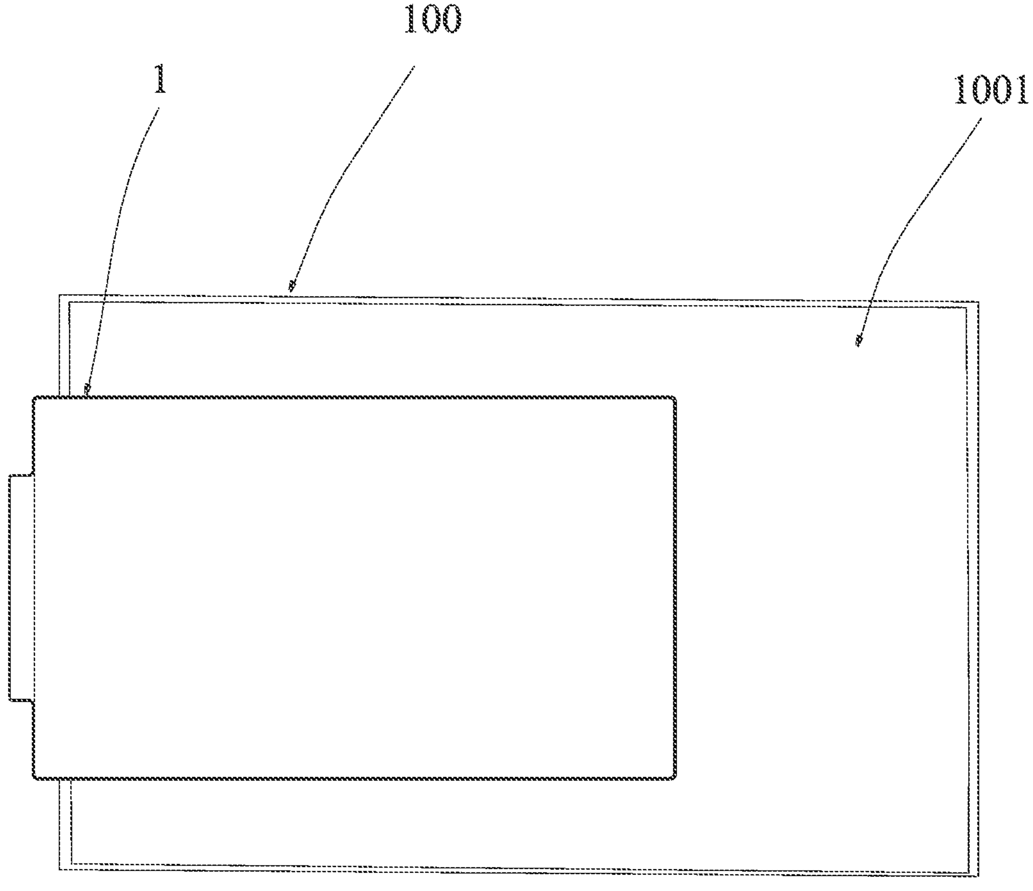
FIG. 16 is a diagram of a stored state of a modifiable embodiment according to the present disclosure.

In a modifiable embodiment, as shown in FIG. 15 to FIG. 16, the expanded screen only includes a second rotating assembly 4, and does not include a first rotating assembly 3. That is, when the expanded screen is fixed to a display 100, the display device 1 can rotate in a direction perpendicular to a display surface 1001 of the display, so that the display device 1 can be switched between a usage state of being located at a side edge of the display and a stored state of being superposed on the display. It is preferred that when the display device 1 rotates, a display surface of the display device 1 is kept being parallel to the display surface 1001 of the display, and the display device 1 can rotate 360 degrees clockwise and anticlockwise, which improves the flexibility of adjusting an angle of the display device. The rotating assembly 4 can be arranged on a side edge of the display device 1 and a side edge of the fixed device 2. That is, the fixed device can rotate to a position above the display device, or can expand towards a width extending direction of the display device and rotate to a position above the display device, which reduces an expansion volume and facilitates storage and carrying. The structures used in the modifiable embodiment can be consistent with the structures in the first embodiment mentioned above. In this modifiable embodiment, the display device 1 can rotate to a front surface of the display through the second rotating assembly 4, so as to be superposed with the display for storage. However, in other modifiable embodiments, the display device 1 can also rotate around the direction perpendicular to the display surface 1001 of the display by adjusting the position of the second rotating assembly, so that the display device 1 can rotate to a back surface of the display, so as to be superposed with the display for storage.

In summary, the expanded screen in this embodiment can adjust a watching direction in multiple angles, with high flexibility. The use of the magnetic suction can quickly fix the expanded screen to the display, so as to improve the user experience.

The above descriptions are only preferred embodiments of the present disclosure, and are not intended to limit the patent scope of the present disclosure. Any equivalent structural transformation made by using the content of the specification and the drawings of the present disclosure under the invention idea of the present disclosure, directly or indirectly applied to other related technical fields, shall all be included in the scope of patent protection of the present disclosure.

What is claimed is:

1. An expanded screen, wherein the expanded screen comprises:

a display device;

a fixed device, wherein the fixed device is configured to be fixed on a display;

a first rotating assembly, wherein the first rotating assembly is rotatably connected to the display device; and a second rotating assembly, wherein one end of the second rotating assembly is rotatably connected to the first rotating assembly, and the other end of the second rotating assembly is connected to the fixed device;

the fixed device rotates through the first rotating assembly around a first axial direction; the fixed device rotates through the second rotating assembly around a second axial direction; the first axial direction is a width extending direction of the display device; and the second axial direction is a direction perpendicular to a display surface of the display;

wherein the first rotating assembly comprises a first connector and a second connector; the first connector is fixedly connected to the display device; the second connector is rotatably connected to the first connector; the second connector rotates around the first axial direction; and the second rotating assembly is rotatably connected with the second connector;

wherein the second connector is a U-shaped connecting plate; the U-shaped connecting plate comprises a first connecting plate, a second connecting plate, and a third connecting plate; the first connecting plate and the second connecting plate are arranged on both sides of the third connecting plate; the first connecting plate and the second connecting plate are rotatably connected to the first connector; first clamping members are arranged on an inner side of the first connecting plate and an inner side of the second connecting plate; the first clamping members sleeve the first connector; two or more first clamping slots are arranged on an inner side wall of the first connecting plate and an inner side wall of the second connecting plate; the first clamping members are provided with first clamping protrusions corresponding to the first clamping slots; the first clamping protrusions are arranged in the first clamping slots; the first clamping protrusions slide from one first clamping slot to the other adjacent first clamping slot; or, two or more first clamping protrusions are arranged on an inner side wall of the first connecting plate and an inner side wall of the second connecting plate; the first clamping members are provided with first clamping slots corresponding to the first clamping protrusions; the first clamping protrusions are arranged in the first clamping slots; and the first clamping protrusions slide from one first clamping slot to the other adjacent first clamping slot;

wherein the second rotating assembly comprises a rotating shaft and second clamping members; one end of the rotating shaft is connected to the fixed device, and the other end of the rotating shaft is rotatably connected through the third connecting plate; the rotating shaft is perpendicular to the third connecting plate; the second clamping members sleeve the rotating shaft, and the second clamping members are arranged on an outer side surface and an inner side surface of the third connecting plate; the second clamping members are provided with two or more second clamping protrusions facing towards the third connecting plate; the third connecting plate is provided with second clamping slots corresponding to the second clamping protrusions; the second clamping protrusions are arranged in the second clamping slots; the second clamping protrusions slide from one second clamping slot to the other adjacent second clamping slot; or, the second clamping members are provided with two or more second clamping slots facing towards the third connecting plate; the third connecting plate is provided with second clamping protrusions corresponding to the second clamping slots; the second clamping protrusions are arranged in the second clamping slots; and the second clamping protrusions slide from one second clamping slot to the other adjacent second clamping slot.

2. The expanded screen according to claim 1, wherein the fixed device is configured to be fixed on the display in a magnetic suction manner.

3. The expanded screen according to claim 2, wherein the fixed device comprises magnetic suction members and a fixed device main body; the magnetic suction members are arranged in the fixed device main body; the magnetic suction members are configured to be sucked to the display; the fixed device main body is connected to the second rotating assembly; and when the second rotating assembly rotates, the second rotating assembly drives the fixed device main body to rotate.

4. The expanded screen according to claim 3, wherein the fixed device main body comprises a base and a cover plate; the base is connected to the second rotating assembly; when the second rotating assembly rotates, the second rotating assembly drives the base to rotate; the base is provided with one or more mounting slots; the magnetic suction members are mounted in the mounting slots; and the cover plate is mounted on the base and covers the magnetic suction members.

5. The expanded screen according to claim 1, wherein the expanded screen further comprises a supporting member; and the supporting member is rotatably arranged on the fixed device.

6. The expanded screen according to claim 1, wherein the first rotating assembly further comprises an outer shell; and the first connector and the second connector are arranged in the outer shell.

7. The expanded screen according to claim 6, wherein a gap is arranged on one side surface of the display device; there are two first connectors; the two first connectors are respectively arranged on two sides of the gap and are fixedly connected to the display device; the first connecting plate and the second connecting plate are respectively connected to the two first connectors; a space is reserved between the two first connectors; a box body is fixedly arranged on an inner side of the outer shell; the box body is located in the space; the box body is fixedly connected to the U-shaped connecting plate; one end, located on an inner side of the U-shaped connecting plate, of the second rotating assembly is arranged in the box body; and the second rotating assembly rotates relative to the box body.

8. The expanded screen according to claim 6, wherein the first connector comprises a fixed end and a connecting end; a stop portion is arranged between the fixed end and the connecting end; the fixed end is fixedly connected to the display device; the first connecting plate and the second connecting plate are rotatably connected to the connecting end; and the first connecting plate and the second connecting plate are fixed between the stop portion and a first nut.

9. The expanded screen according to claim 8, wherein the connecting end is a connecting column; at least one first section is arranged on an outer side wall of the connecting column; a through hole is formed in each first clamping member; the through hole is matched with a shape of the outer side wall of the connecting column; the through hole sleeves the outer side wall of the connecting column, so that the connecting column drives the first clamping member to rotate.

10. The expanded screen according to claim 8, wherein one or more first elastic members are arranged between the first clamping member and the first nut.

11. The expanded screen according to claim 10, wherein a connecting portion extending outwards is arranged on one side surface of the display device; the gap is arranged on the connecting portion; and the fixed end is fixedly connected to the connecting portion.

12. The expanded screen according to claim 1, wherein the second rotating assembly further comprises a third connector; the third connector sleeves the rotating shaft; the third connector is fixedly connected to the fixed device; and when the rotating shaft rotates, the third connector is driven to rotate, so that the third connector drives the fixed device to rotate.

13. The expanded screen according to claim 12, wherein the second rotating assembly further comprises a separator; and the separator is arranged between the third connector and the second clamping member close to the third connector, so that the third connector is separated from the second clamping member close to the third connector.

14. The expanded screen according to claim 13, wherein the second rotating assembly further comprises second nuts; the second nuts are arranged at two ends of the rotating shaft; the third connector, the separator, the second clamping member, and the third connecting plate are arranged between the two second nuts; the second rotating assembly further comprises one or more second elastic members; and each second elastic member is located between the second nut arranged on an inner side of the third connecting plate and the second clamping member.

15. The expanded screen according to claim 1, wherein at least one second section is arranged on an outer side wall of the rotating shaft.

* * * * *